March 24, 1931. L. SAIVES 1,797,797
ENDLESS TRACK VEHICLE
Filed Nov. 8, 1926
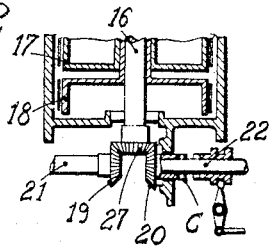
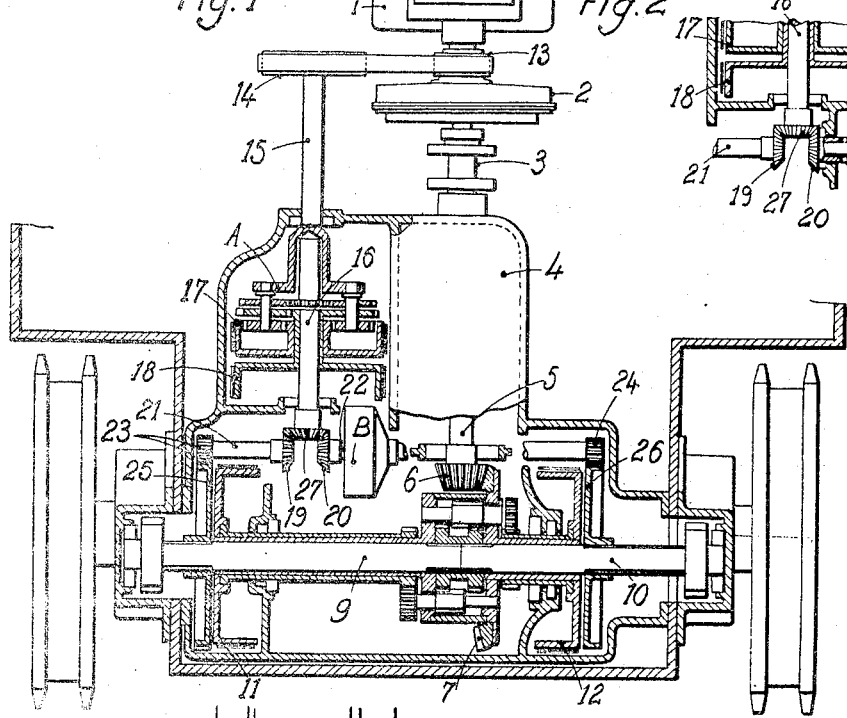
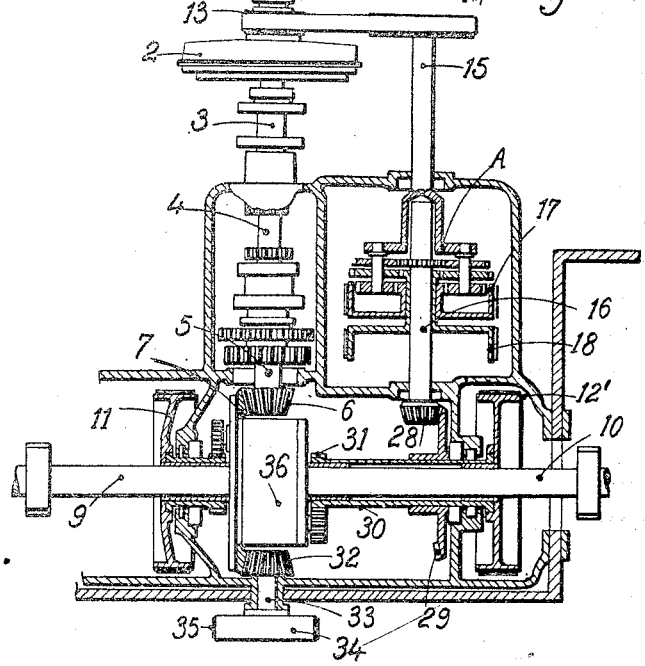
INVENTOR
LÉON SAIVES.
By O'Neill & Bunn
ATTORNEYS.

Patented Mar. 24, 1931

1,797,797

UNITED STATES PATENT OFFICE

LÉON SAIVES, OF BILLANCOURT, FRANCE, ASSIGNOR TO SOCIETE ANONYME DES USINES RENAULT, OF BILLANCOURT, FRANCE, A CORPORATION OF FRANCE

ENDLESS-TRACK VEHICLE

Application filed November 8, 1926, Serial No. 147,035, and in France December 3, 1925.

The invention relates to vehicles running on endless tracks in which steering is effected by change of speed of the wheels gearing, or in contact, with these tracks or chains.

When a transmission is used for driving said wheels comprising a controlled differential gear such as is described in the specification of U. S. Patent No. 1,253,319, granted January 15, 1918, one of the wheels at the instant of turning has a speed greater by a certain amount than that of normal running in a straight line, whilst the other wheel has a speed less by the same amount than that of normal running.

The use of such an arrangement is suitable for steering agricultural tractors, but has defects on certain special apparatus, such as fighting cars, in which, besides the transport of the guns, the aiming has to be ensured. This manœuvre must be done when the vehicle is not advancing.

The apparatus, which is the subject of the present invention, comprises in addition to the aforesaid differential gear, an auxiliary transmission, operating, when the main transmission is declutched, upon the endless track wheels and causing them to turn in opposite directions, so that the vehicle slews about its centre of gravity.

The speed reduction of the auxiliary transmission may be chosen in such way that this turning movement intended for the preliminary aiming may be made as slow as possible.

Several methods of carrying out the invention will be described, but it is to be understood that modifications may be made in details, such as the speed change, clutches and the like, employed without departing from the scope of the invention.

The invention is illustrated in the accompanying drawings, in which:

Fig. 1 is a partial sectional plan view of one form of the apparatus.

Fig. 2 is a fragmentary sectional plan view, showing a modified structure.

Fig. 3 is a sectional plan view of a modified form of the apparatus shown in Fig. 1.

Referring to Fig. 1 engine 1 of the vehicle transmits its motion through an intermediate clutch 2 to a primary shaft 3 of a change-speed gear 4.

The change-speed gear drives a shaft 5, which in turn drives, through the conical pinions 6 and 7 and a differential formed by the gearing below the pinions 6 and 32, and the gear 7, at the left, as shown at the lower left-hand portion of Fig. 1 of the drawings, the shafts 9 and 10 driving the the wheels, which may be operated directly or by any suitable transmission.

The steering of the vehicle is effected by braking one or other of the drums 11 and 12.

The apparatus, which is the subject of the invention, consists of an auxiliary transmission comprising the following members.

A pulley 13 for belt or chain, or a pinion, is keyed on the driving shaft in front of the clutch 2; this pulley drives a second pulley 14 fixed on an auxiliary power or primary shaft 15 of a direction change gear A (planetary for example) transmitting motion in one direction or the other to an auxiliary transmission shaft 16.

The motion in one direction or the other is obtained by braking one of the drums 17 or 18. The disposition of the drums 17 and 18 with their planetary gears permit the transmission of motion from shaft 15 to shaft 16, in one direction or the other, by braking one of the drums. But, in the normal running of the vehicle, neither of the drums is braked and auxiliary shaft 16 is idle.

The shaft 16 carries at its end a pinion 27 meshing with two pinions 19 and 20 fixed on the shafts 21 and 22. These two shafts, whatever may be their direction of rotation, will always rotate in reverse directions to each other.

The shaft 21 has at its end a pinion 23 and the shaft 22 a pinion 24, which mesh respectively with the toothed wheels 25 and 26 fixed on the shafts 9 and 10, for driving the wheels imparting motion to the endless tracks.

A clutch B, for example a cone-clutch, is provided on the shaft 22, which is divided for this purpose, to allow the running in the same direction of the pinions 23 and 24 when driven by the main transmission 5.

The operation is as follows:

The shaft 22 is interrupted by the clutch B; the vehicle is moving under the action of the transmission 5, the shafts 9 and 10 rotate in the same direction; this is the normal running of the vehicle.

When the vehicle, used as a tank or gun-carriage, has reached the scene of operations, the auxiliary transmission is then employed for slewing.

The shaft 3 is declutched, the engine then drives only the shaft 15 through the intermediary of the pulleys 13 and 14.

By means of a control (mechanical or hydraulic) one of the drums 17 or 18 for changing the running is braked and at the same time the clutch B couples the two sections of the shaft 22.

The shaft 16 will rotate in one direction or the other according to which of the drums 17 or 18 is braked and will drive the shafts 21 and 22 through the pinions 27, 19 and 20.

It has been stated that these shafts 21 and 22 rotate in reverse directions to each other, as well as the pinions 23 and 24 and the wheels 25 and 26.

The shafts 9 and 10 driving the wheels and attached to them will also rotate in reverse directions, the chains or endless belts will move in reverse directions, and the vehicle will slew about its centre of gravity.

Fig. 2 shows how the cone-clutch B may be replaced by a dog-clutch C; any other known type of clutch may also be employed without departing from the scope of the invention.

The planetary direction change gear A may also be replaced by any other type of change gear.

Fig. 3 shows a second way of carrying out the invention.

The action of the driving shafts of the wheels by the main transmission takes place as before.

Similarly there is provided as before an auxiliary transmission comprising a direction change-gear receiving motion from the driving shaft at a point located in front of the clutch of the main transmission.

The shaft 16 has at its end a pinion 28 meshing with a crown-wheel 29 attached to the hollow shaft 30 carrying the central pinion 31 and the brake drum 12' for normal direction.

The pinion 7 operating the differential meshes with a pinion 32 fixed on a shaft 33 upon which is fixed a drum 34.

The drum 34 is used in normal running for stopping the vehicle by means of a band brake 35, but can be employed in parallel with the auxiliary transmission to obtain slewing about the centre of gravity of the apparatus.

The operation of this arrangement is as follows:

The vehicle is stopped by means of the declutching mechanism 2 assisted by the braking of the drum 34 by means of the band-brake 35.

By keeping the drum 34 braked the casing 36 of the differential is held fast through the intermediary of the pinions 7 and 32.

If at this instant the direction change gear A, which is at the dead point, be operated, by braking the drum 17 or the drum 18, the shaft 16 will be driven and also the hollow shaft 30 through the pinions 28, 29; further by the intermediary of the set of pinions constituting the differential, the shaft 9 and the shaft 10 will be driven but they will rotate in reverse directions causing the slewing of the vehicle, one endless track moving in the reverse direction to the other.

In order to obtain slewing in the other direction the direction change gear A will be operated.

In order to change from normal running to slewing when at rest the main transmission is declutched at 2, the drum 34 braked, and then one of the drums 17 or 18 is operated according to the direction of slewing to be carried out.

I claim:

In an endless track vehicle, a main power shaft, a clutch, a transmission gear and shaft, a differential gear, and a change speed gear for transmitting motion from said main power shaft to the transmission shaft actuating the differential gear, two drive wheels taking motion from said differential gear, each of which is placed at one side of the vehicle, an auxiliary power shaft operatively connected to said main power shaft, an auxiliary transmission shaft, means for connecting said auxiliary power shaft to the auxiliary transmission shaft, whereby to either render said auxiliary transmission shaft idle or to rotate it in one direction or in the other, and transmission gears for operating said wheels from said auxiliary transmission shaft.

In testimony whereof I affix my signature.

LÉON SAIVES.